Jan. 1, 1963     E. H. DINGER     3,071,697
PULSE GENERATOR UTILIZING TRANSISTOR WITH SATURABLE CORE
FEEDBACK AND ADJUSTABLE BIAS TO VARY LOAD CURRENT
Filed Sept. 26, 1960     2 Sheets-Sheet 1
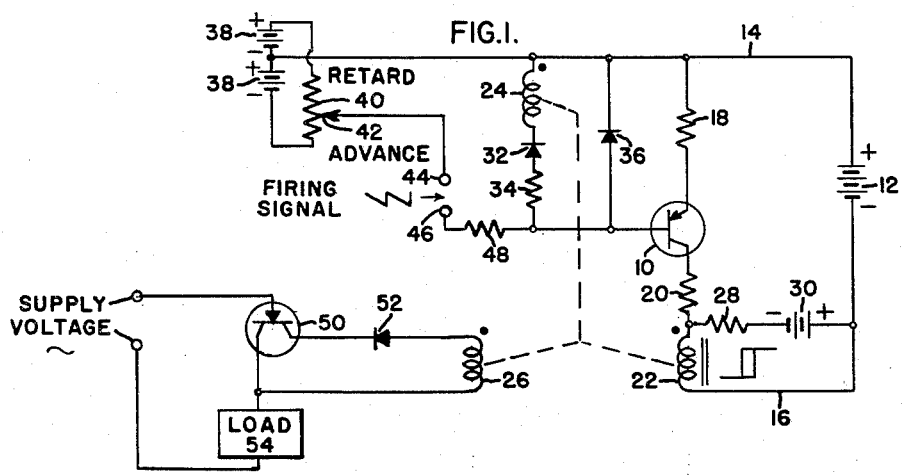
INVENTOR:
EDWARD H. DINGER,
BY James G. Williams
HIS ATTORNEY.

Jan. 1, 1963  E. H. DINGER  3,071,697
PULSE GENERATOR UTILIZING TRANSISTOR WITH SATURABLE CORE
FEEDBACK AND ADJUSTABLE BIAS TO VARY LOAD CURRENT
Filed Sept. 26, 1960  2 Sheets-Sheet 2
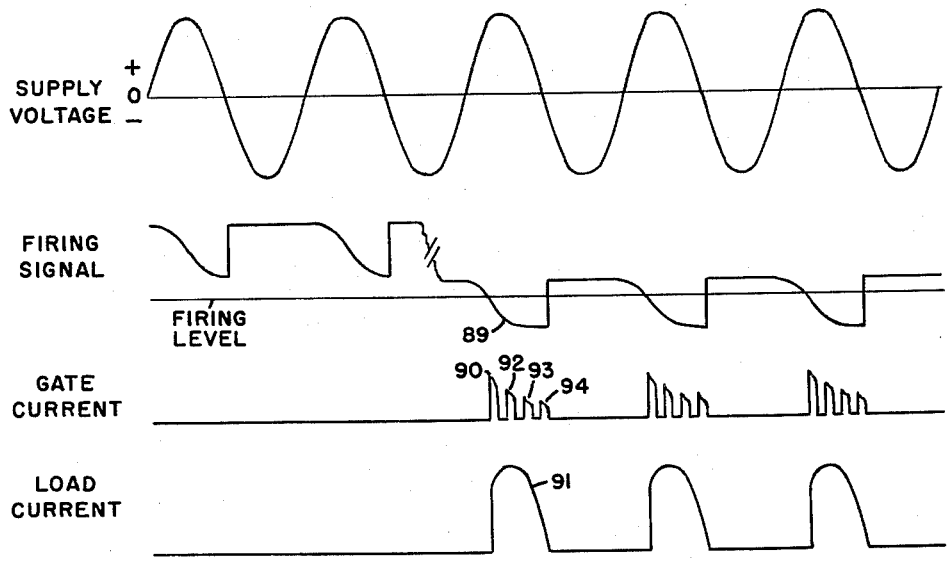
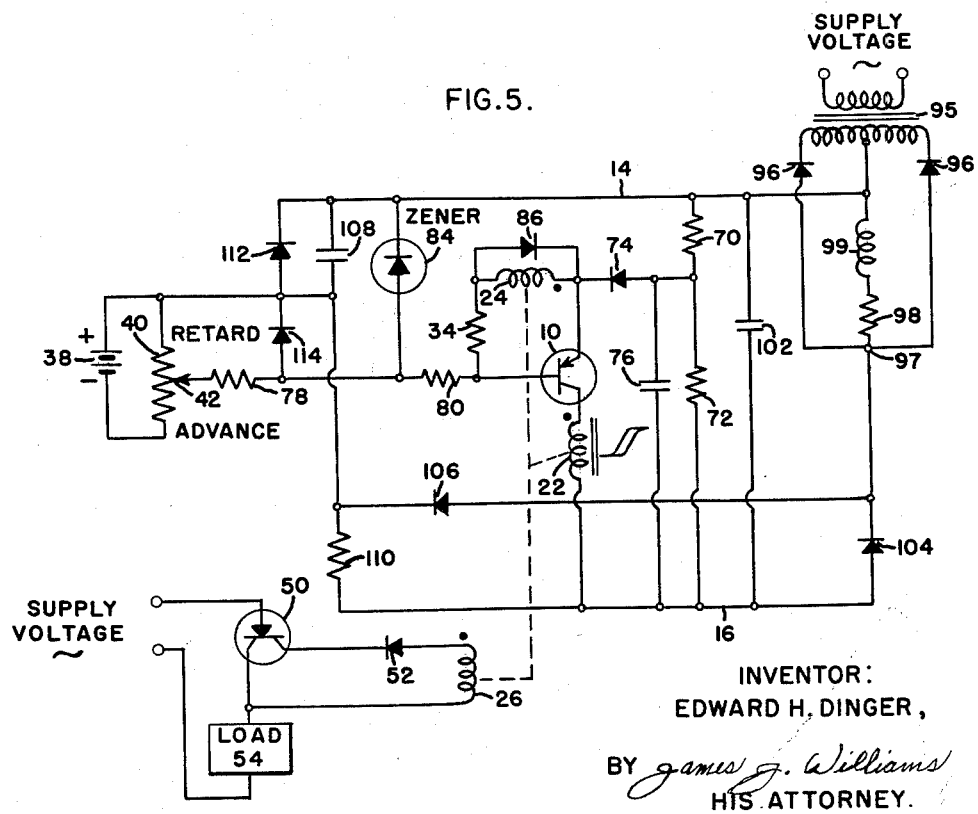
INVENTOR:
EDWARD H. DINGER,
BY James J. Williams
HIS ATTORNEY.

United States Patent Office 3,071,697
Patented Jan. 1, 1963

3,071,697
PULSE GENERATOR UTILIZING TRANSISTOR WITH SATURABLE CORE FEEDBACK AND ADJUSTABLE BIAS TO VARY LOAD CURRENT
Edward H. Dinger, Waynesboro, Va., assignor to General Electric Company, a corporation of New York
Filed Sept. 26, 1960, Ser. No. 58,474
11 Claims. (Cl. 307—88.5)

The invention relates to a pulse generating circuit, and particularly to a pulse generating circuit for providing firing pulses at a controllable time for a controlled rectifier.

Controlled rectifiers and similar devices are being used with increasing frequency in control circuits. For example, direct current motors may be conveniently controlled by connecting the armature of the motor in series with a controlled rectifier and connecting the series circuit across an alternating current source. The power applied to the armature may be controlled by controlling the current flow through the controlled rectifier. The current flow through the controlled rectifier is controlled by the application of proper signals or pulses to the gate electrode of the controlled rectifier at the desired time.

Accordingly, an object of the invention is to provide a novel pulse generating circuit for producing pulses at controllable times.

As mentioned, controlled rectifiers may be used with an alternating current source. Such use is desirable because the voltage of the alternating current falls to zero each half cycle, thus providing convenient means for turning off the controlled rectifier. However, the controlled rectifier can be turned on only when its anode is relatively positive with respect to its cathode, and this characteristic requires some synchronization between the anode-cathode polarity and the application of the signals or pulses to the gate electrode of the controlled rectifier.

Thus, another object of the invention is to provide a pulse generating circuit for producing pulses during a particular portion of an alternating current cycle.

Another object of the invention is to provide a pulse generating circuit for producing pulses at a controllable time during a particular portion of an alternating current cycle.

The pulse generating circuit preferably operates on relative low power signals. In fact, the pulse generating circuit may have only a relatively low power signal available to it for controlling the time at which pulses of relatively high power must be produced.

Consequently, another object of the invention is to provide a pulse generating circuit capable of producing relatively high power pulses at controllable times in response to relatively low power signals.

In accordance with the invention, these and other objects are fulfilled by a circuit including a transistor having its output circuit coupled to the primary winding of a saturable core device. A regenerative winding of the saturable core device is coupled to the input circuit of the transistor so that signals in the output circuit are applied to the input circuit through the windings of the saturable core device so as to provide regenerative operation. A small external control signal is applied to the input circuit to initiate an output signal, after which the regenerative effect of the saturable core device and its windings provides a large signal in the output circuit. This large signal may be derived from the saturable core device for any desired use, such as one of the uses previously mentioned.

The invention will be better understood from the following description taken in connection with the accompanying drawing, and its scope will be pointed out in the claims. In the drawing:

FIGURE 1 shows one embodiment of the invention utilizing an external firing signal and a fixed voltage supply source;

FIGURE 2 shows waveforms illustrating the operation of the embodiment of FIGURE 1;

FIGURE 3 shows another embodiment of the invention showing a firing circuit for providing a firing signal and utilizing a capacitor for providing a voltage supply;

FIGURE 4 shows waveforms illustrating the operation of the embodiment of FIGURE 3; and FIGURE 5 shows another embodiment of the invention utilizing a common power supply for providing a direct current for the embodiment as well as for providing firing signals.

In the drawing, the same reference numerals are used to refer to the same parts in the different figures. In FIGURE 1, the pulse generating circuit includes a transistor 10 of the PNP type having an emitter, a base, and a collector. A first source 12 of unidirectional potential is provided, and the positive terminal of the first source 12 is coupled to a positive bus 14. The negative terminal of the first source 12 is coupled to a negative bus 16. The emitter of the transistor 10 is coupled to the positive bus 14 through an emitter resistor 18. The collector of the transistor 10 is coupled to one end of a collector resistor 20. A saturable core device is provided, this device having a primary winding 22 coupled to its core, a regenerative winding 24 coupled to its core, and a load winding 26 coupled to its core. The core of the saturable core device is illustrated schematically by the lines adjacent the primary winding 22 in FIGURE 1. Saturable core devices are known in the art, and may be characterized as having a hysteresis loop that has relatively flat ends. A typical hysteresis loop, and one suitable for the saturable core device used in the embodiment of FIGURE 1, is also shown adjacent the primary winding 22. The three windings 22, 24, 26 are schematically indicated as being coupled to the same core by dashed lines. The turns ratio of the primary winding 22 to the load winding 26 and to the regenerative winding 24 may be 1:1:2 respectively, or any suitable value. The dots adjacent one end of each of the windings 22, 24, 26 indicate the relative voltage polarities for an instantaneous current flow through any one of the windings 22, 24, 26. The primary winding 22 of the saturable core device is coupled in the output circuit or in series with the emitter-collector circuit of the transistor 10 by having one end coupled to the other end of the collector resistor 20 and by having the other end coupled to the negative bus 16. A reset circuit including a reset resistor 28 and a reset source 30 of unidirectional potential are coupled between the negative bus 16 and the junction of the collector resistor 20 and the primary winding 22. A regenerative circuit, including the regenerative winding 24, a diode 32, and a limiting resistor 34, is coupled between the positive bus 14 and the base of the transistor 10. The diode 32 and the regenerative winding 24 are poled relative to each other, relative to the type of the transistor 10, and relative to the primary winding 22 so that forward emitter-base current flows through the transistor 10 in response to voltage induced in the regenerative winding 24 by forward current through the emitter-collector circuit of the transistor 10 and through the primary winding 22. A protective diode 36 may be coupled between the base of the transistor 10 and the positive bus 14 to limit the reverse potential which may be applied between the base and emitter of the transistor 10. An input circuit is provided for the embodiment of FIGURE 1 and includes a variable source of direct current connected in series with a firing signal source (not shown) having an internal impedance suitable for use with the embodiment. This variable source of direct current and firing signal source are effectively applied between the base and the emitter of the transistor 10. The input circuit comprises a control source 38 of unidirectional potential having its positive terminal coupled to the upper end of a potentiometer 40 and its negative terminal coupled to the lower end of the potentiometer 40. An intermediate tap of the control source 38 is coupled to the positive bus 14. The potentiometer 40 has a variable tap 42 which engages the potentiometer 40 over its entire movement. The variable tap 42 is coupled to one of two terminals 44, 46 to which the firing signal source is applied. The other of the two terminals 44, 46 is coupled through an input resistor 48 to the base of the transistor 10.

Output signals or pulses from the pulse generating circuit of FIGURE 1 are derived through the load winding 26. One end of the load winding 26 is coupled through an output diode 52 to the gate electrode of a controlled rectifier 50. The other end of the load winding 26 is coupled to the cathode of the controlled rectifier 50. A load 54, represented as a block, is also coupled to the cathode of the controlled rectifier 50. A suitable source of alternating current potential or supply voltage (having a frequency of 60 cycles, for example) is applied between the anode of the controlled rectifier 50 and the other end of the load 54. Thus, direct current may flow through the load 54 when the controlled rectifier 50 is rendered conductive.

The operation of the pulse generating circuit shown in FIGURE 1 will be described with reference to the waveforms shown in FIGURE 2. When the circuit is put in operation, the supply voltage and the undirectional sources 12, 30, 38 are first applied as shown. However, the load 54 receives no current until the controlled rectifier 50 is rendered conducting. In the absence of a firing signal (and in the absence of a connection between the terminals 44, 46), no current flows through the transistor 10 and through the windings 22, 24, and 26. However, when a suitable firing signal, such as the sawtooth shaped firing signal illustrated in FIGURE 2, is applied across the terminals 44, 46, the transistor 10 may be rendered conductive. Whether and when the transistor 10 is rendered conductive depends upon the setting of the variable tap 42. If the variable tap 42 is positioned upward in the retard direction, it provides a relatively positive voltage that overcomes the negative-going effect of the firing signal so that the transistor 10 is not turned on. This is illustrated by the firing signal curve 55. However, if the variable tap 42 is positioned downward in the advance direction, a point, arbitrarily designated the firing level, will be reached at which the combination of the voltage supplied by the variable tap 42 and the firing signal permits emitter-base current to flow in the transistor 10. This current causes the transistor 10 to begin to conduct. This condition is illustrated by the firing signal curve 56. When the transistor 10 is turned on or rendered conductive, current flows from the positive bus 14 through the emitter resistor 18, the emitter-collector circuit of the transistor 10, the collector resistor 20, and the primary winding 22 to the negative bus 16. Current flow through the primary winding 22 in the direction just indicated causes a voltage to be induced in the regenerative winding 24, this voltage having a polarity which causes a clockwise flow of current from the upper end of the regenerative winding 24 through the positive bus 14, the emitter resistor 18, the emitter-base circuit of the transistor 10, the regenerative resistor 34, and the regenerative diode 32 back to the lower end of the regenerative winding 24. This current flow is in addition to the emitter-base current resulting from the firing signal so that the transistor 10 conducts current more heavily through its emitter-collector circuit. This additional current flows through the primary winding 22, which in turn causes further emitter-base current to flow through the transistor 10. Thus, there is a regenerative effect which provides a sharp pulse of emitter-collector current through the transistor 10 and through the primary winding 22. This regenerative effect is sufficient to enable enough emitter-base current to flow in the transistor 10 and enable the emitter-collector current to supply all load current reflected into the primary winding 22. The pulse of current through the primary winding 22 induces a voltage across the load winding 26, this induced voltage being of such polarity with respect to the gate electrode and cathode of the controlled rectifier 50 as to provide a gate current pulse 57 of substantially fixed duration and amplitude. This gate pulse turns the controlled rectifier 50 on if the anode of the controlled rectifier 50 is sufficiently positive with respect to its cathode. In FIGURE 2 it will be noted that no load current is provided during the negative portions of the supply voltage cycles because the anode of the controlled rectifier 50 is negative with respect to its cathode. Hence, the firing signal and gate pulses shown in FIGURE 2 are not needed during these negative portions of the supply voltage cycles.

The regenerative effect (and the sharp pulse of emitter-collector current) mentioned in the previous paragraph continues until the saturable core device is saturated, at which time the voltages induced in the regenerative winding 24 and in the load winding 26 fall to zero. The gate current pulse 57 falls sharply to zero as shown, and the emitter-base current in the transistor 10 is reduced to the value supported by the firing signal 56. This reduced emitter-base current is still sufficient to support enough emitter-collector current in the transistor 10 to overcome the effect of the reset circuit and keep the saturable core device saturated. Once the firing signal rises above the firing level, the transistor 10 is cut off. The saturable core device is reset by current flowing from the positive terminal of the reset source 30 through the negative bus 16, upward through the primary winding 22, and through the reset resistor 28 to the negative terminal of the reset source 30.

However, the controlled rectifier 50 will continue to conduct and supply a load current pulse 58 as long as the anode is positive with respect to the cathode. The fact that the gate current pulse 57 is removed and that the transistor 10 is cut off does not cut the controlled rectifier 50 off. In fact, a relatively short duration of gate pulse is desired because the controlled rectifier 50 will dissipate less heat in its gate electrode. The controlled rectifier 50 will continue to conduct until the anode voltage falls below some value determined by the characteristics of the controlled rectifier 50, among other things.

Since the controlled rectifier 50 must, in order to conduct, receive a pulse of gate current during the time that the anode is positive with respect to the cathode, it will be seen that some synchronization between the gate current and the anode-cathode voltage must be provided. Hence, there must be some degree of synchronization between the firing signal applied to the terminals 44, 46 and the supply voltage. One condition of synchronization is indicated in FIGURE 2. Once the supply voltage falls to a value where the anode of the controlled rectifier 50 is negative with respect to its cathode, the controlled rectifier 50 is cut off, and the load current pulse 58 falls to zero. The cycle is then repeated as long as the firing signal is applied.

If the variable tap 42 is positioned still farther downward in the advance direction, a more negative firing signal 59 will be provided. The transistor 10 is turned on relatively earlier than in the previous example to provide gate current pulses 60 (of the same duration and amplitude as the gate current pulses 57) also relatively earlier than in the previous example. The controlled rectifier 50 is turned on at an earlier time with relation to the supply voltage cycle so that load current pulses 61 of greater duration and amplitude are provided. Thus, with the sawtooth-shaped firing signal having the phase relation with the supply voltage as shown, the time occurrence of the gate current pulses, and hence the average load current, may be varied by changing the position of the variable tap 42. Other ways of varying the time occurrence of the gate pulses may be used in place of the circuit shown in FIGURE 1.

FIGURE 3 shows another embodiment of the invention, this embodiment utilizing a charged capacitor for a supply voltage source and providing firing signals from a circuit supplied by the alternating current supply voltage. In FIGURE 3 the same or comparable parts have been given the same reference numerals as the corresponding parts in FIGURE 1. In the embodiment of FIGURE 3, the intermediate tap of the control source 38 is not needed, and the positive terminal is coupled directly to the positive bus 14 and the upper end of the potentiometer 40. The negative terminal is coupled to the lower end of the potentiometer 40. A voltage divider network comprising two resistors 70, 72 is coupled between the positive bus 14 and the negative bus 16. The junction of the voltage divider resistors 70, 72 is coupled through a protective diode 74 to the emitter of the transistor 10. A capacitor 76 is also coupled from this junction to the negative bus 16. The variable tap 42 of the potentiometer 40 is coupled through two serially connected input resistors 78, 80 and through a firing circuit 82 to the base of the transistor 10. A Zener diode 84 is coupled between the junction of these input resistors 78, 80 and the positive bus 14 to limit the control signal. A reset limiting diode 86 is coupled across the regenerative winding 24. The firing circuit 82 comprises the rectifier, resistor, capacitor network shown, this network being supplied with the alternating current supply voltage through a transformer 88. The firing circuit 82 is described in my application entitled "Wave Generating Circuit" which is assigned to the same assignee as is this application; filed concurrently herewith on September 26, 1960, Ser. No. 58,570. Briefly, the firing circuit provides portions of cosine waver when the upper end of the secondary winding of the transformer 88 is positive with respect to its lower end so that the capacitor 89 receives a charge. The capacitor 89 is discharged when the upper end of the secondary winding of the transformer 88 is negative with respect to its lower end. The firing signal in FIGURE 4 shows the portions of cosine waves so produced relative to the sinusoidal supply voltage. The portions of the cosine waves function in the same manner as the sawtooth waves described in connection with FIGURE 1. It should be noted that any convenient firing circuit can be used in the embodiment of FIGURE 3.

In the operation of the circuit shown in FIGURE 3, the capacitor 76 receives a charge determined by the value of the first source 12 and the relative values of the voltage divider resistors 70, 72. When the firing signal falls below the firing level of the transistor 10 as shown by the firing signal 89 in FIGURE 4, the transistor 10 is turned on. The capacitor 76 then supplies current through a path including the protective diode 74, the emitter-collector circuit of the transistor 10, and the primary winding 22 of the saturable core device. As described in connection with FIGURE 1, a voltage is induced in the regenerative winding 24 with the result that a heavy pulse of current flows through the primary winding 22, this current being supplied by the capacitor 76. This pulse induces a voltage in the load winding 26 so that a gate current pulse 90 flows in the output circuit. The gate current pulse 90 causes the controlled rectifier 50 to be turned on and initiates the load current pulse 91. During the period immediately following, the capacitor 76 begins to discharge so that its voltage is reduced. The emitter-base current in the transistor 10 decreases because the induced voltage in the regenerative winding 24 decreases and because, as a result of the reduced voltage on the capacitor 76, more of the emitter-base current is offset by increasing current from the firing circuit 82 through the base-emitter circuit of the transistor 10 toward the upper terminal of the capacitor 76. Eventually, the emitter-base current falls to a value so that the transistor 10 is cut off. Immediately after transistor 10 has been cut off, conditions are similar to those existing before the firing signal went below the firing level. That is, the base-emitter circuit of the transistor 10 and the protective diode 74 are back-biased. The difference now, however, is that conduction is prevented by virtue of the fact that the voltage at the upper terminal of the capacitor 76 coupled to the junction of the resistors 70, 72 is substantially at the potential of the negative bus 16. The capacitor 76 begins to charge again until it develops sufficient voltage to cause the transistor 10 to turn on again and thereby provide a subsequent gate current pulse 92. The cycles are repeated as long as the firing signal 89 is below the firing level and result in the subsequent gate current pulses 93, 94. It will be noted that the subsequent gate current pulses have progressively less amplitude because the increasingly negative firing signal does not permit the capacitor 76 to receive as much charge before the transistor 10 is turned on again.

The intervals between the gate current pulses 90, 92, 93, 94 depend upon the capacitor recharge rate, among other things. During the intervals between the gate current pulses, the saturable core device has sufficient time to reset, this resetting being accomplished by the inherent nature of the core material used. A characteristic of such a material is shown adjacent to the primary winding 22 in FIGURE 3, and it will be seen that in the absence of forward saturating current, the saturable core device will reset itself without the aid of a reset circuit such as shown in FIGURE 1. The reset limiting diode 86 limits the reset rate so as to prevent the generation of excessive voltage on the windings during the reset. However, if a material such as assumed in FIGURE 1 is used in the arrangement of FIGURE 3, a reset circuit may be desirable. Likewise, a saturable core device such as assumed in FIGURE 3 may be used in the arrangement of FIGURE 1 without the necessity of a reset circuit. Again with reference to FIGURE 4, when the firing signal goes above the firing level, no gate current pulses are produced until the firing signal again goes below the firing level. As shown in FIGURE 4, and as explained in connection with FIGURE 2, the firing signal may be varied by moving the variable tap 42 toward either the retard direction or the advance direction to effectively control the point in time at which the gate current pulses begin. The initial gate current pulse turns the controlled rectifier on, and the point at which the controlled rectifier 50 begins conducting determines the average load current provided during alternate half cycles. In regard to the gate current pulses 90, 92, 93, 94, it is preferable to have a number of such pulses rather than the single, greater duration gate current pulses 57, 60 shown in FIGURE 2 because more reliable firing is provided and there is less chance of no firing because of too much advance of the firing signal.

FIGURE 5 shows another embodiment of the invention, the embodiment of FIGURE 5 differing primarily from the embodiment of FIGURE 3 in that the potentiometer circuit is interchanged with the firing circuit. Otherwise, the two circuits are quite similar. The firing circuit shown in FIGURE 5 is also described in the previously mentioned patent application entitled "Wave Generating Circuit." Briefly, the firing circuit includes a transformer 95 having a center-tapped secondary winding. The cathodes of two diodes 96 are coupled to respective ends of the secondary winding, and the anodes are coupled together at a junction 97. The junction 97 is coupled through a resistor 98 and an inductance 99 to the center tap of the secondary winding. At the junction 97, there appears a rectified full wave, but unfiltered, voltage which makes negative-going excursions with respect to the positive bus 14. This rectified voltage at the junction 97 is coupled to a capacitor 102 by a diode 104 and provides filtered direct current between the positive bus 14 and the negative bus 16. This filtered direct current is used in the other parts of the circuit of FIGURE 5. A sawtooth generating capacitor 108 is coupled in series with a resistor 110 between the positive bus 14 and the negative bus 16. The sawtooth capacitor 108 tends to charge toward the voltage across the two busses 14, 16, but is discharged through a diode 106 coupling the junction 97 to the lower (negative) plate of the capacitor 108 each time the junction 97 approaches zero from its negative excursion. Thus, a sawtooth voltage appears across the capacitor 108 and is coupled to the base of the transistor 10 through the voltage determined by the variable tap 42. The diode rectifiers 112, 114 are provided to provide appropriate limiting for the combined potentiometer circuit and firing circuit.

The operation of the circuit shown in FIGURE 5 is substantially the same as the operation of the circuit shown in FIGURE 3. The major difference is that the circuit of FIGURE 5 has its own inherent sawtooth generating circuit and common power supply for the circuit. However, this is merely a convenience in design, and does not affect the operation.

While the invention has been described in connection with specific embodiments, persons skilled in the art will appreciate that modifications and changes may be made. For example, different core materials may be used in the saturable core device, the characteristics of such materials determining whether reset circuits are necessary. Also, the potentiometer 40 and its control source 38 may be replaced with an automatically varied voltage, such as provided by programmed information. Various turns ratios between the windings may be used. Likewise, the NPN variety of transistors may be used, if appropriate circuit changes are made. Thus, although the invention is described with reference to particular embodiments, it is to be understood that modifications may be made by persons skilled in the art without departing from the spirit of the invention or from the scope of the claims.

What I claim as new and desire to secure by Letters Patent of the United States is:

1. A pulse generating circuit comprising a transistor having input and output electrodes, a source of potential connected to said input and output electrodes and supplying biasing potential thereto, a saturable core device having a primary winding and a regenerative winding, means coupling said primary winding to said output electrodes of said transistor, means coupling said regenerative winding to said input electrodes of said transistor, said primary and said regenerative windings being relatively arranged so that output current in said transistor and in said primary winding induces a voltage in said regenerative winding which has a polarity that provides additional base current in said input electrodes of said transistor, means coupled to said saturable core device for deriving an output signal therefrom, a load, a second source of potential, and switching means operative in response to said output signal for connecting said second source of potential to said load.

2. A pulse generating circuit comprising a reference bus, a source of unidirectional potential, a transistor having an emitter, a base, and a collector, a saturable core device having a primary winding and a regenerative winding coupled thereto, means coupling said primary winding in a series circuit with the emitter-collector circuit of said transistor, means coupling said series circuit between said bus and said source of potential, means coupling said regenerative winding between said emitter and said base of said transistor, said primary winding and said regenerative winding being arranged relative to each other so that emitter-collector current in said primary winding induces a voltage in said regenerative winding prior to saturation of said saturable core device, said induced voltage having a polarity to produce base current in the normal direction in said transistor, a load, means coupled to said base for selectively applying a signal thereto to initiate emitter-collector current in said primary winding at a time determined in accordance with the amount of power to be delivered to said load, means coupled to said saturable core device for deriving an output signal therefrom a second source of potential, and switching means operative in response to said output signal for connecting said second source of potential to said load.

3. The pulse generating circuit recited in claim 2, said saturable core device comprising a material having a characteristic such that said saturable core device substantially resets itself in the absence of current flow in said primary winding.

4. A pulse generating circuit comprising a transistor having an emitter, a base, and a collector, a saturable core device having a primary winding, a regenerative winding, and a load winding coupled thereto, means coupling the emitter-collector circuit of said transistor in series with said primary winding to form a series circuit, a source of unidirectional potential, means coupling said series circuit across said source of unidirectional potential, means coupling said regenerative winding to the emitter-base circuit of said transistor so that current flow in the normal direction through said series circuit and through said primary winding induces a voltage across said regenerative winding, said induced voltage having a polarity which causes base current to flow in the normal direction in said transistor, further means coupled to said emitter-base circuit of said transistor for applying a periodic signal thereto which cyclically varies in magnitude, biasing means for selectively positioning said periodic signals in a range of voltage magnitude within which emitter-collector current will be initiated through said series circuit whereby said base current provided by said regenerative winding causes an additional current flow in the normal direction through said transistor and through said series circuit, a second source of potential, a load, and switching means serially connected with said load and said second source of potential and operative in response to voltage induced in said load winding for connecting said second source of potential to said load.

5. A pulse generating circuit comprising a transistor having an emitter, a base, and a collector, a saturable core device having a primary winding, a regenerative winding, and a load winding coupled thereto, means coupling the emitter-collector circuit of said transistor in series with said primary winding to form a first series circuit, a first source of unidirectional potential, means coupling said first series circuit across said first source of unidirectional potential, means coupling said regenerative winding to the emitter-base circuit of said transistor so that current flow in the normal direction through said series circuit and through said primary winding induces a voltage across said regenerative winding, said induced voltage having a polarity which causes base current to flow in the normal direction in said transistor; a variable source of unidirection potential, means for generating a varying firing signal, means coupling said variable source of potential to said generating means to form a second circuit, means coupling said second circuit to said emitter-base circuit of said transistor for applying a signal thereto to initiate current flow in the normal direction through said first series circuit in accordance with the magnitude of said variable source of potential, whereby said base current provided by said regenerative winding causes an additional current flow in the normal direction through said transistor and through said series circuit, and a load coupled to said load winding.

6. The pulse generating circuit recited in claim 2 in combination with means connected to said primary winding and operative to continuously apply a potential thereto with a polarity designed to reset said saturable core device.

7. A pulse generating circuit comprising a transistor having input and output electrodes and adapted to supply current at said output electrodes in accordance with the voltage applied between said input electrodes, a saturable core device having a primary winding and two secondary windings, a source of direct current, means serially interconnecting said primary winding, said output electrodes, and said source of direct current, means regeneratively connecting one of said secondary windings between said input electrodes to increase the voltage therebetween in response to increased current flow in said primary winding, control means selectively operative to produce a unidirectional potential of desired magnitude, generating means for generating a periodic signal which cyclically varies in magnitude, means serially connecting said control means and said generating means to said transistor to initiate conduction therein when the combined magnitude of their respective outputs attains a predetermined level, and means including the other of said secondary windings responsive to current in said primary windings prior to saturation of said saturable core device to produce an output.

8. A pulse generating circuit as defined in claim 7 in combination with means operative when the combined magnitude of the outputs of said control means and said generating means is insufficient to maintain conduction of said transistor to establish a particular flux density in said saturable core device.

9. A pulse generating circuit as defined in claim 7 in combination with a source of alternating current, a load, and switching means operative in response to said output to connect said load and said source of alternating current, whereby the magnitude of the unidirectional potential produced by said control means determines the power applied to said load.

10. A pulse generating circuit comprising a transistor having input and output electrodes and adapted to supply current at said output electrodes in accordance with the voltage applied between said input electrodes, a saturable core device having a primary winding and two secondary windings, a source of direct current, energy storage means connected across said source of direct current, means serially interconnecting said primary winding, said output electrodes, and said energy storage means, means regeneratively connecting one of said secondary windings between said input electrodes to increase the voltage therebetween in response to increased current flow in said primary winding, control means selectively operative to produce a unidirectional potential of desired magnitude, generating means for generating a periodic signal which cyclically varies in magnitude, means serially connecting said control means and said generating means to said transistor to initiate conduction therein when the combined magnitude of their respective outputs attains a predetermined level, said conduction being sustained during periods when the magnitude of the energy stored in said energy storage means bears a predetermined relationship to the combined magnitude of the outputs of said control means and said generating means, and means responsive to current in said primary windings prior to saturation of said saturable core device to produce an output.

11. A pulse generating circuit as defined in claim 10 in combination with a source of alternating current, a load, and switching means operative in response to said output to connect said load and said source of alternating current, whereby the magnitude of the unidirectional potential produced by said control means determines the power applied to said load.

References Cited in the file of this patent
UNITED STATES PATENTS

| | | |
|---|---|---|
| 2,878,440 | Jones | Mar. 17, 1959 |
| 2,953,741 | Pittman et al. | Sept. 20, 1960 |
| 2,989,651 | Smith | June 20, 1961 |